Nov. 2, 1954

J. C. WATERBURY 2,693,264

FRUIT-PICKER'S BAG

Filed Dec. 30, 1950

Julius C. Waterbury

Inventor

By Glenn S. Fish

Attorney

Nov. 2, 1954 J. C. WATERBURY 2,693,264
FRUIT-PICKER'S BAG
Filed Dec. 30, 1950 2 Sheets-Sheet 2
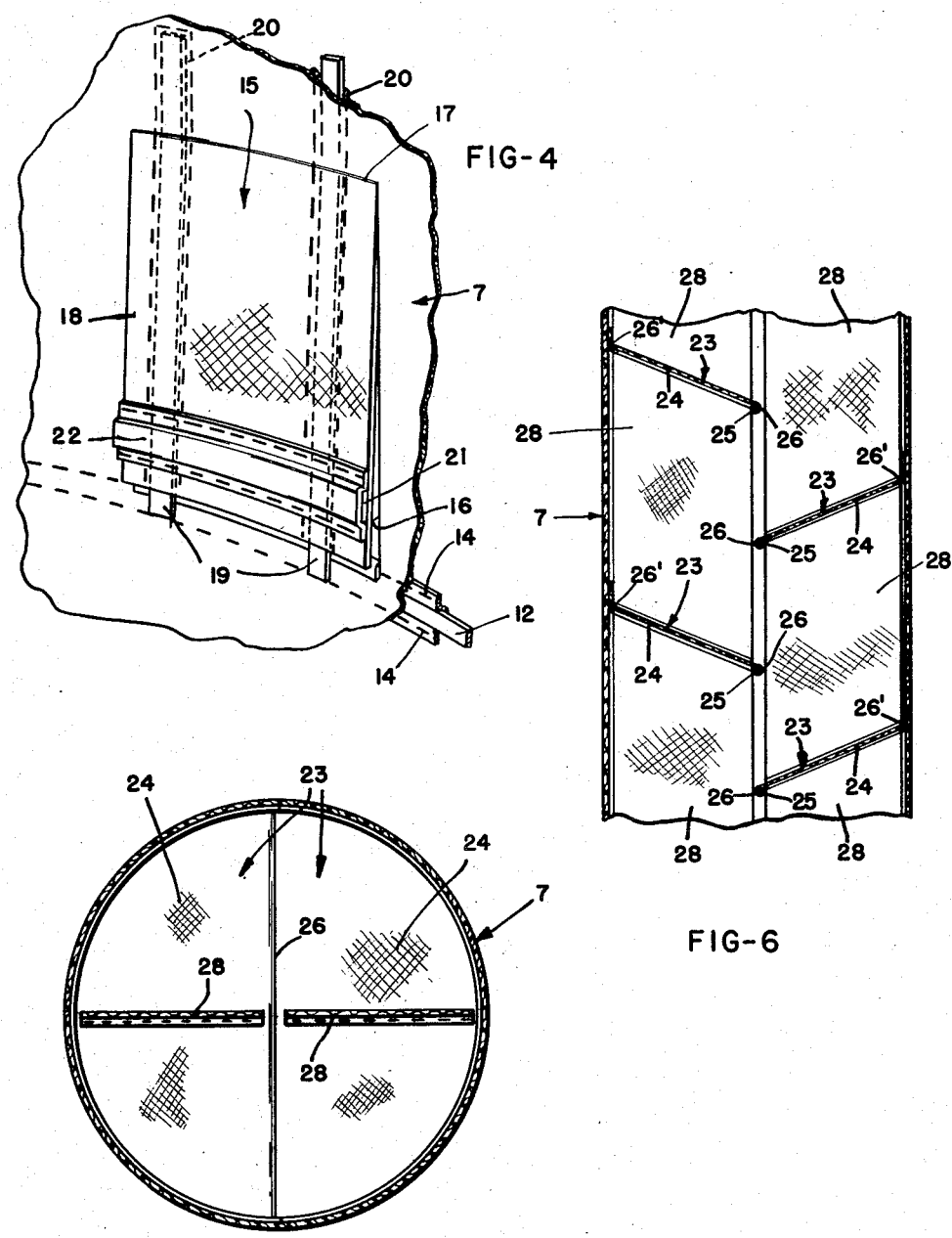
Julius C. Waterbury
Inventor

United States Patent Office 2,693,264
Patented Nov. 2, 1954

2,693,264

FRUIT-PICKER'S BAG

Julius C. Waterbury, Spokane, Wash.

Application December 30, 1950, Serial No. 203,700

1 Claim. (Cl. 193—7)

My present invention relates to the general class of fruit picker's appliances and more particularly to a fruit picker's bag.

One object of the invention lies in the provision of a fruit picker's bag that need not be carried by the picker, but which may be supported from a limb of the tree or a portion of the ladder from which the picker is working. This object is accomplished by providing a bag which does not support the apples placed therein, but after each apple has traversed the baffled length of the bag, it is deposited in a receptacle resting on the ground or other support. The combined weight of the fruit does not affect the weight of the bag and it may be supported from any limb handy to the picker.

Another object of the invention lies in the provision of a fruit picker's bag with a tubular body having internal baffles stitched therein successively alternate diametrically thereof downwardly spaced from each other the full length of the bag to retard the fall of the fruit and cause it to be deposited in the receptacle without bruise.

Another object of the invention lies in the provision of a fruit picker's bag with spaced shaping bands to maintain the tubular configuration of the body and prevent its being permanently distorted from its round tubular shape.

Another object of the invention lies in the provision of wire reinforcing for the baffles which preclude the forming of pockets which would be liable to retain a fruit instead of retarding its movement.

Another object of the invention lies in providing the tubular body with side openings so that fruit may be deposited in the bag from various heights by inserting it through a selected side opening.

These and other objects will be apparent during the course of the following description.

In the accompanying drawings, forming a part of this specification, and in which like numerals are employed to designate like parts, throughout the same, Figure 1 is a perspective view of my improved fruit picker's bag showing the bag in its supported position with a receptacle at its lower end to receive fruit passing therethrough, Figure 2 is a longitudinal cross section through the upper portion of my invention, Figure 3 is a plan view of one of the baffles for the bag and has a portion broken away for convenience of illustration, Figure 4 is a fragmentary perspective view of a side opening and a closure therefor, Figure 5 is transverse cross section through a picker's bag having vertical separators therein as a modification, and, Figure 6 is a longitudinal cross section of a bag having the modification.

Referring now more particularly to the drawings it will be apparent that the bag consists of a round tubular body 7 which is made of fabric such as canvas. The top of the tubular body is provided with a casing 8, stitched at 8' to the body and, which contains a supporting ring 9 substantially circular in plan but provided with diametrically opposed, radially extending and upwardly inclined protuberent portions 10 constituting connecting ears to which supporting straps 11 are secured.

Below ring 9, I have provided a plurality of spaced shaping bands 12 secured to the peripheral face of the body by means of straps of material 13 overlaying said bands and being stitched to the body at 14 adjacent the longitudinal edges of said straps forming a casing for the bands.

A side opening 15 is shown spaced from the top and comprises a substantially square aperture 16 formed by making a U-shaped cut in the side of the body and leaving the top uncut form a hinge as at 17. The portion of fabric defined by the U-shaped cut constitutes a closure 18 for the aperture 16 and spaced vertical resilient stiffening straps 19 are secured by casings 20 and extend downwardly beyond the lower edge of closure 18 to bear against the body 7 at a point reinforced by a shaping band 12. A lateral stiffening strap 21 is secured by a casing 22 stitched to the closure. The side opening is formed in the body at a position about its periphery at right angles to the diametrically opposed connecting ears 10, and between two vertically spaced baffles 23.

Baffles 23 are positioned within the body so as to retard the fall of fruit deposited therein. The baffles each consist of a semi-circular section of fabric 24 provided with a reinforcing wire 25 which is secured by wrapping the marginal edges of the fabric over the reinforcing wire and stitching the two thicknesses of fabric within the reinforcing wire. It will be understood that the stitching may be omitted and the fabric may be secured by an adhesive or other means if desired.

The baffles 23 are secured in the tubular body 7 by stitching them about the arcuate portion 26' of the semi-circular fabric 24. The straight front edge 26 is at right angles to the side opening 15 and in alignment with the diameter taken through the supporting ears 10. Each baffle 23 is positioned in the body 7 with its straight edge 26 at a lower horizontal plane than the center of its arcuate portion 26' and thus each one is disposed at a downward incline toward the diameter of the body 7. With relation to each other, the baffles 23 are downwardly spaced and diametrically alternated in the body to cause a fruit deposited therein to roll off of one baffle onto the next succeeding diametrically opposed baffle where its direction of movement is changed to roll and drop to the next succeeding baffle. It can be plainly seen that the fruit must follow a ziz-zag course to the bottom of the bag.

The movement of the fruit downwardly through the improved picker's bag is thus retarded by changing its course of descent by means of a plurality of baffles and the fruit is protected from bruising when reaching the receptacle 27 by reason of very slow speed and low momentum.

In the modification exemplified in figures 5 and 6, vertically positioned separators 28 are provided between the upper face of one baffle 23 and the under side of the baffle next above. The separators are positioned in a vertical plane at right angles to the diameter of the body 7 indicated by the baffle edge 26. Thus if two fruit are deposited in the bag at one time by reason of their size, they will be separated by said separators and thus preclude bruising each other during their simultaneous descent. The fruit when ripe are of a size almost equal to one fourth of the area of the tube on a horizontal plane.

It is to be understood that the invention is not to be restricted to the precise arrangement of parts shown and described, as details of construction may be modified and rearranged without departing from the spirit of the invention, the scope of which is limited only by the terms of the appended claims.

Having thus described one physical embodiment of my invention, I claim:

A fruit picker's bag comprising an elongated tubular fabric body open at upper and lower ends, transverse baffles in said body disposed one above another and spaced from each other longitudinally of the body, all of said baffles being disposed at a downward incline towards a transversely extending lower end edge and each having margins of side edge portions and an upper end portion firmly secured to the fabric body, said baffles being alternately mounted at opposite sides of the tubular body and having their lower end portions in slightly overlapping relation to each other whereby fruit passing downwardly through the body and rolling along the baffles towards lower edges thereof will drop from one baffle to another during movement towards the lower end of the body, semicircular reinforcing frames from said baffles formed of wire and extending along the upper ends and the side edges and along the free lower edges of the baffles and constituting spreaders for the tubular body as well as reinforcements for edge portions of the baffles, a portion of the body above one of said baffles being formed with an opening and a closure flap for the opening, said flap being attached across its upper end to the body and free along its side edges and across its lower end, and stiffener strips extending vertically along the outer surface of said flap and having upper portions secured to the outer surface of the body above the flap, said stiffener strips having lower portions projecting downwardly beyond the lower end of the flap and into the bag through the opening in position for engaging the inner surface of the body below the opening and thereby preventing outward movement of the flap through the opening and yieldably holding the flap closed while permitting movement of the flap inwardly into the body to an opened position.

References Cited in the file of this patent

UNITED STATES PATENTS

| Number | Name | Date |
|---|---|---|
| 366,721 | Graves | July 19, 1887 |
| 788,956 | Smith | May 2, 1905 |
| 967,365 | Gordon | Aug. 16, 1910 |
| 1,309,119 | Dillon | July 8, 1919 |
| 1,334,643 | Ansley | Mar. 23, 1920 |
| 1,839,494 | Pardee | Jan. 5, 1932 |
| 1,839,712 | Sturtz | Jan. 5, 1932 |
| 2,032,258 | Caton | Feb. 25, 1936 |